Feb. 6, 1940. G. G. HARRINGTON 2,189,029
REAMER
Filed Dec. 6, 1938
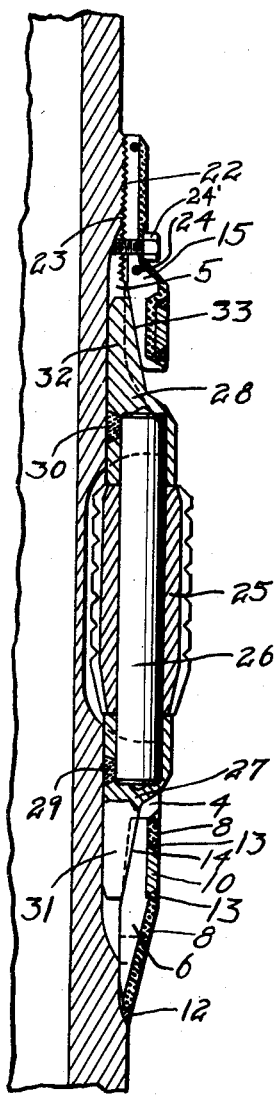
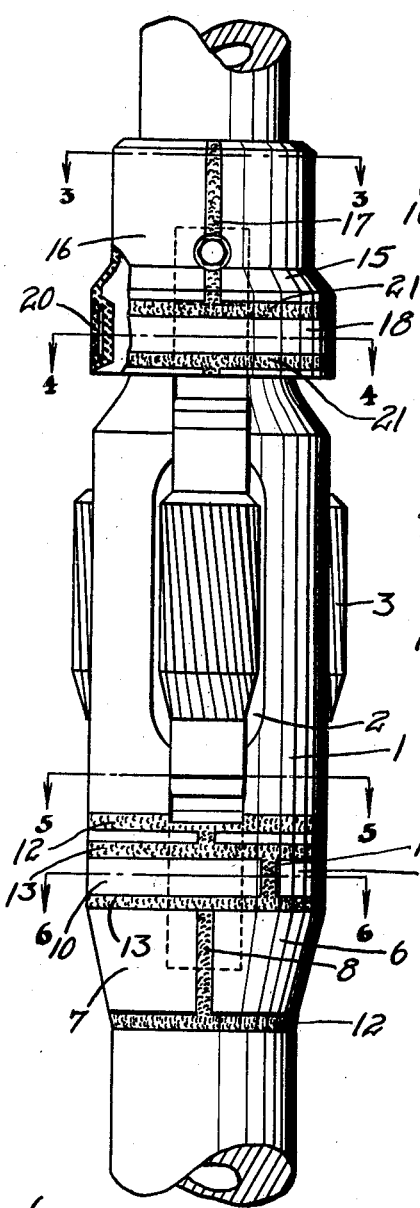
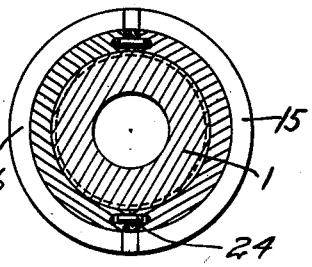
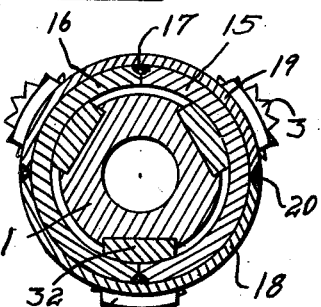
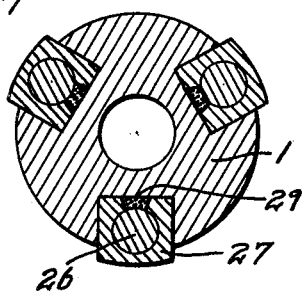
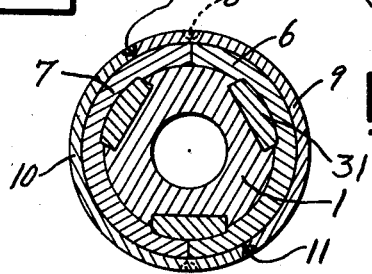
George G. Harrington,
Inventor Patented Feb. 6, 1940

2,189,029

UNITED STATES PATENT OFFICE 2,189,029

REAMER

George G. Harrington, Houston, Tex., assignor to Reed Roller Bit Company, Houston, Tex., a corporation of Texas Application December 6, 1938, Serial No. 244,140

12 Claims. (Cl. 255—73)

This invention relates to reamers for use in drilling wells or the like and has for its general object the provision of a means for firmly and securely, yet detachably, mounting a reamer cutter in a reamer body.

In mounting reamer cutters it is necessary that they be mounted firmly on the reamer body and that there be no possibility of play between any of the parts constituting the mounting during the operation of the reamer.

It is, therefore, an object of this invention to provide a structure for mounting a reamer cutter in a recess in the side of a reamer body in such a manner as to give the greatest possible degree of rigidity to the mounting, prevent any lost motion between the parts of the mounting during operation and at the same time utilize the smallest number of parts and eliminate any parts which might be broken or distorted.

It is a further object of this invention to provide a reamer mounting, the structure of which is such that the reamer cutter may be removed and replaced with a minimum of effort, without necessity for any special skill and without necessity for any special or extraordinary tools.

Another object of this invention is to provide a reamer mounting, the structure of which is such that the reamer may be mounted and dismounted without the use of any tools other than those customarily employed in the drilling of wells.

Another object of this invention is to provide a structure in which the reamer cutter may be rotatably mounted upon a support and provided with the proper clearance in the factory under the supervision of skilled workmen, and that thereafter the reamer cutter assembly thus provided, including the cutter and its mounting, may be readily secured on or removed from a reamer body in use in the field.

Another object of this invention is to provide retaining means for a reamer cutting assembly for retaining it on a reamer body, which retaining means may be of great strength and yet capable of being placed about the body without necessity for passing it over the end of the body.

Another object of this invention is to provide a reamer body with cutter assembly retaining means, which means will not project radially a substantial distance beyond the regular contour of the reamer body.

Other objects and advantages of this invention will become apparent from the following description taken in connection with the accompanying drawing, it being understood that the same are by way of illustration and example only.

In the drawing:

Fig. 1 is a side elevation of a reamer body constructed in accordance with this invention having reamer cutters mounted thereon.

Fig. 2 is a longitudinal cross section through one of the cutters and through a part of the reamer body shown in Fig. 1.

Fig. 3 is a transverse cross section taken along the line 3—3 of Fig. 1.

Fig. 4 is a transverse cross section taken along the line 4—4 of Fig. 1.

Fig. 5 is a transverse cross section taken along the line 5—5 of Fig. 1.

Fig. 6 is a transverse cross section taken along the line 6—6 of Fig. 1.

In accordance with this invention the reamer body 1 is provided with a plurality of major recesses 2 adapted to receive reamer cutters 3 of the roller type. In the lower ends of each of these major recesses 2 is an auxiliary recess 4 and at the upper end a second auxiliary recess 5. These auxiliary recesses open into the major recesses at the opposite ends thereof.

Secured about the reamer body 1 and partly overlying the lower auxiliary recesses 4 is a split ring formed in two major semi-circular parts 6 and 7 welded together at their ends as shown at 8, and a pair of minor semi-circular parts 9 and 10 surrounding the parts 6 and 7 and disposed in a circumferential channel in those parts and welded together at 11. The major parts 6 and 7 are substantially the same outer diameter as the body 1 of the reamer and are welded along their edges to this body as shown at 12. The minor parts 9 and 10 are likewise of substantially the same outer diameter as the adjacent outer diameter of the major parts 6 and 7 and are welded thereto along their opposite edges as at 13. It will be seen that the arrangement just described provides in each of the auxiliary recesses 4 a socket and by virtue of a tapering of the inner surface of the major parts 6 and 7 where they overlie these sockets as shown at 14, the sockets are each tapered toward a smaller radial dimension in a direction away from the major recess.

The auxiliary recesses 5 are similar to the recesses 4 but do not have overlying them a permanently secured ring such as the one which has been described as overlying the recess 4. Instead, there is a ring similarly formed of two major parts 15 and 16 welded together at their ends, as shown at 17, and two minor parts 18 and 19 welded together at their ends, as shown at 20. The minor parts are countersunk into the outer surfaces of the major parts in the same manner as in the previously described ring and are welded to the major parts along their opposite edges 21 in the manner previously described. The major parts, however, are not welded to or otherwise permanently secured to the body of the reamer. Instead, they are internally threaded at 22, to engage the threads 23 on the body of the reamer. For the purpose of arranging the major parts 15 and 16 in proper relationship so that the threads 22 will register with each other, there are provided in the parts 15 and 16 dowel pins 24 each pin being adapted to engage both of the parts 15 and 16 and hold these parts in proper position while they are being welded together. It will be seen that the composite ring thus formed may be rotated upon the threads 23 to move it to a position overlying the recesses 5 in much the same manner that the composite ring which overlies the lower auxiliary recesses 4 is disposed with respect to those recesses. For the purpose of holding this composite ring in the proper threaded engagement on the body, a set screw 24' is threaded through the ring and adapted to be tightened into engagement with the body and preferably with one of the recesses 5.

The reason for making the threaded composite ring of several different parts and welding them together instead of making it all in one part is that the body 1 is customarily formed with an enlarged bell shaped portion at its opposite ends where it is joined to the drill pipe and that if the ring were made solid, it would be impossible to place it over the body and have it engage the threads 23.

It will be seen, however, that in the case of each of the rings described, a very strong ring will be formed by virtue of the fact that not only are the two major parts of the ring welded together and in the case of the lower ring, welded along their edges to the body, but in each case there is a second ring welded about the first ring and having its welded joints disposed in offset relation to the welded joints of the first ring. And this second ring serves as a steel band to prevent the first ring from being split longitudinally. This is strengthened by the fact that the second ring is welded to the first ring along both of its edges throughout the entire circumference of the rings.

The reamer cutter which is to be mounted on the reamer body is shown at 25, rotatably mounted upon a pin 26 extending through the major recess 2, and into the respective minor recesses 4 and 5. Welded to the opposite ends of this pin are blocks 27 and 28, respectively. These blocks are shown welded to the pin at 29 and 30 and are of substantially the same form. The lower block 27 has a tapered tongue or extension 31 which is adapted to be inserted into one of the recesses 4 beneath the ring which extends thereover and to be wedged within the tapered socket formed in such recess by said ring. The other block 28 likewise has a tapered tongue 32, adapted to lie within the recess 5 and to receive the ring which is screwed on to the body and overlies the recesses 5. This ring as it is screwed downwardly has an inclined portion 33 adapted to engage the inclined surface of the tongue 32 and urge the same both longitudinally to urge the tongue 31 into its socket and radially to secure the block 28 firmly within the recess 5. At the same time this ring will become slightly distorted by virtue of its engagement at three circumferentially spaced points with the three blocks 28, and due to its inherent resiliency will constantly tend to resume its circular shape and will thereby resiliently and continuously urge the blocks 27 and 28 into their seated positions. Thus, by means of simply rotating the threaded composite ring referred to, the reamer assembly may be secured in or released from the reamer body if and when desired. As above stated, this ring may be held against backward or unthreading movement by means such as the set screw 24'.

It will be appreciated that the cutter assembly consisting of the cutter 25, pin 26 and blocks 27 and 28, welded to the ends of the pin, is preferably assembled in the factory where it can be done under expert supervision so that the reamer 25 may be properly mounted and given the proper clearance to insure free rotation without excessive movement which could lead to vibration. These cutter assemblies are then transported to the field where the reamers are then used in the drilling of wells and when it is found that a reamer cutter has been worn or otherwise damaged so that its replacement becomes desirable, it is only necessary to loosen the set screw 24', unscrew the threaded composite ring, remove the old cutter assembly, insert the new one and tighten the threaded composite ring again, locking it in place with the set screw 24'. This is an operation which can be carried on by the use simply of the tongs and rotating equipment customarily employed in the drilling of wells.

At the same time, it will be appreciated that a sturdy and durable mounting for reamer cutters has been provided and that the fewest possible number of parts has been employed. A reamer cutter mounting has thus been provided which is capable of achieving all of the objects and producing all of the advantages sought by this invention.

Having described by invention, I claim:

1. In a reamer construction, a reamer body having a major recess in one side thereof and an auxiliary recess at one end of said major recess, and a ring around said body and extending over said auxiliary recess to form a socket opening toward said major recess, said ring having an inner surface inclined radially outwardly where it extends over said auxiliary recess so that said socket will taper toward a smaller radial dimension in a direction away from said major recess.

2. In a reamer construction, a reamer body having major recesses at circumferentially spaced points about its outer surface, and an auxiliary recess at one end of each larger recess, a reamer cutter in each major recess, a supporting block for supporting each of said cutters and lying in said auxiliary recesses respectively, and a resilient ring adapted to be forced into position surrounding said blocks and into engagement with said blocks only, to slightly distort said ring whereby said ring will serve to resiliently urge said blocks into said auxiliary recess at all times.

3. In a reamer construction, a reamer body having a major recess in one side thereof and an auxiliary recess at one end of said major recess, a ring around said body and extending over said auxiliary recess to form a socket opening toward said major recess, a reamer cutter adapted to be mounted in said major recess, means for rotatably mounting said cutter, and a block on one end of said last mentioned means, said block having a tongue thereon adapted to wedgingly engage said socket.

4. In a reamer construction, a reamer body having a major recess in one side thereof, and an auxiliary recess at one end of said major recess, and a ring around said body and extending over said auxiliary recess, said ring comprising two major semi-circular parts welded together at their ends.

5. In a reamer construction, a reamer body having a major recess in one side thereof and an auxiliary recess at one end of said major recess, and a ring around said body and extending over said auxiliary recess, said ring comprising a plurality of major parts welded together at their ends, and a plurality of minor parts surrounding said major parts and welded together at their ends, the welded ends of said major parts being offset circumferentially from the welded ends of said minor parts.

6. In a reamer construction, a reamer body having a major recess in one side thereof and an auxiliary recess at one end of said major recess, and a ring around said body and extending over said auxiliary recess, said ring comprising a plurality of major parts welded together at their ends, and a plurality of minor parts surrounding said major parts and welded together at their ends, the welded ends of said major parts being offset circumferentially from the welded ends of said minor parts, and said minor parts being welded to said major parts throughout their length.

7. In a reamer construction, a reamer body having a major recess in one side thereof and an auxiliary recess at one end of said major recess, and a ring around said body and extending over said auxiliary recess, said ring comprising a plurality of major parts welded together at their ends, and a plurality of minor parts surrounding said major parts and welded together at their ends, the welded ends of said major parts being offset circumferentially from the welded ends of said minor parts, and said minor parts being countersunk into the outer surface of said major parts to form a continuance of the smooth outer contour of said major parts.

8. In a reamer construction, a reamer body having a major recess in one side thereof and an auxiliary recess at one end of said major recess, a ring around said body and extending over said auxiliary recess, said ring comprising a plurality of parts welded together at their ends and being countersunk into the surface of said body to form a continuation of the smooth outer contour of said body.

9. In a reamer construction, a reamer body having a major recess in one side thereof and an auxiliary recess at one end of said major recess, a ring around said body and extending over said auxiliary recess, said ring comprising a plurality of parts welded together at their ends and being countersunk into the surface of said body to form a continuation of the smooth outer contour of said body, and welded to said body throughout its circumference.

10. In a reamer construction, a reamer body having a major recess in one side thereof and an auxiliary recess at one end of said major recess, and a ring on said body movable longitudinally thereof to a position overlying said auxiliary recess, said ring consisting of two major semi-circular parts welded together at their ends and two minor semi-circular parts surrounding said major parts and welded together at their ends, the welded ends of said major and minor parts being offset circumferentially from each other.

11. In a reamer construction, a reamer body having a major recess in one side thereof and a pair of auxiliary recesses at the respective ends of said major recess, and a pair of rings surrounding said body and overlying said auxiliary recesses respectively.

12. In a reamer construction, a reamer body having a major recess in one side thereof and a pair of auxiliary recesses at the respective ends of said major recess, and a pair of rings surrounding said body and overlying said auxiliary recesses, respectively, one of said rings being movable longitudinally of said body, and a cutter assembly consisting of a reamer cutter and a pair of blocks adapted to fit into said auxiliary recesses beneath said rings respectively, and rotatably carrying said reamer cutter.

GEORGE G. HARRINGTON.